United States Patent

Warner et al.

[11] Patent Number: 6,071,459
[45] Date of Patent: Jun. 6, 2000

[54] PROCESS OF MAKING METATHESIS POLYMERIZED OLEFIN ARTICLES CONTAINING FLAME-RETARDING AGENTS

[75] Inventors: Mark Warner, Benton, Ark.; Michael A. Giardello, Pasadena, Calif.

[73] Assignee: A. O. Smith Corporation, Milwaukee, Wis.

[21] Appl. No.: 09/148,654

[22] Filed: Sep. 4, 1998

Related U.S. Application Data

[60] Provisional application No. 60/057,958, Sep. 5, 1997.

[51] Int. Cl.$^7$ .................................................. B29C 41/04
[52] U.S. Cl. ........................ 264/311; 264/330; 525/331.9; 525/332.1; 525/332.3; 525/359.1; 525/359.5; 525/359.6; 528/490; 528/491
[58] Field of Search ............................ 428/500; 264/240, 264/310, 311, 319, 328.6, 330, 331.13, 331.15; 525/331.9, 332.1, 332.3, 359.1, 359.5, 359.6; 528/490, 491

[56] References Cited

U.S. PATENT DOCUMENTS

| | | |
|---|---|---|
| 4,246,367 | 1/1981 | Curtis, Jr. . |
| 4,301,306 | 11/1981 | Layer . |
| 4,324,717 | 4/1982 | Layer . |
| 4,380,617 | 4/1983 | Minchak et al. . |
| 4,507,453 | 3/1985 | Tom . |
| 4,584,425 | 4/1986 | Tom . |
| 4,661,575 | 4/1987 | Tom . |
| 4,708,969 | 11/1987 | Leach . |
| 4,709,098 | 11/1987 | Dolfini et al. . |
| 4,748,216 | 5/1988 | Tom . |
| 4,808,364 | 2/1989 | Blunt et al. ............................. 264/311 |
| 4,822,839 | 4/1989 | Paisner . |
| 4,899,005 | 2/1990 | Lane et al. . |
| 4,902,560 | 2/1990 | Silver . |
| 4,906,797 | 3/1990 | Lane, Jr. et al. . |
| 4,943,621 | 7/1990 | Janda et al. . |
| 5,061,521 | 10/1991 | Endo et al. . |
| 5,063,103 | 11/1991 | Sugawara et al. . |
| 5,069,943 | 12/1991 | Hara et al. . |
| 5,266,370 | 11/1993 | Woodson et al. . |
| 5,268,232 | 12/1993 | Khasat et al. . |
| 5,278,305 | 1/1994 | Kelsey . |
| 5,296,566 | 3/1994 | Brown-Wensley et al. . |
| 5,312,940 | 5/1994 | Grubbs et al. . |
| 5,342,909 | 8/1994 | Grubbs et al. . |
| 5,369,195 | 11/1994 | Kelsey . |
| 5,378,783 | 1/1995 | Okumura et al. . |
| 5,464,585 | 11/1995 | Fitzgibbon ............................. 264/108 |
| 5,480,940 | 1/1996 | Khasat et al. . |
| 5,539,060 | 7/1996 | Tsunogae et al. . |

*Primary Examiner*—Jan H. Silbaugh
*Assistant Examiner*—Kenneth M. Jones
*Attorney, Agent, or Firm*—Michael Best & Friedrich LLP

[57] ABSTRACT

A metathesis polymerized polyolefin article is provided which includes a flame-retarding agent. The method of making the article includes polymerizing an olefin monomer via a metathesis polymerization reaction in the presence of a one-part metathesis polymerization catalyst and a compatible flame-retarding agent.

13 Claims, No Drawings

PROCESS OF MAKING METATHESIS POLYMERIZED OLEFIN ARTICLES CONTAINING FLAME-RETARDING AGENTS

RELATED APPLICATION

This application claims the benefit under 35 U.S.C. Section 119 of co-pending U.S. Provisional Patent Application Serial No. 60/057,958 filed Sep. 5, 1997.

FIELD OF THE INVENTION

The present invention relates to articles made of metathesis polymerized olefins, including polycycloolefins, incorporating flame-retarding agents, and methods for producing the same.

BACKGROUND PRIOR ART

Numerous polymers of olefins, especially polymers of cycloolefins, produced through metathesis polymerization reactions using a metathesis catalyst are technologically and commercially important materials. Especially important are polymers of cycloolefins that are produced through Ring Opening Metathesis Polymerization (ROMP) reactions. Many such materials are tough and rigid, and have excellent chemical resistance. For many applications, it is desirable to provide articles made of such material with an additional degree of flame retardance.

However, it has been problematic to incorporate flame-retarding agents into polyolefins produced through metathesis polymerization reactions. Largely, these problems have been due to the sensitivity and intolerance of metathesis catalysts to any impurities/additives, including flame-retarding agents, within the polymerization reaction mixture, or present during the metathesis polymerization.

The original catalysts systems used for metathesis reactions were of the Ziegler type. A variety of other systems have also been developed based on tungsten and molybdenum. All of these metathesis catalyst systems are easily poisoned by impurities, air, moisture, and by many pigments, fillers, and additives, including most known flame retarding agents. Therefore, the production of polyolefins using these catalysts cannot occur in the presence of many known flame-retarding agents.

It is desirable to provide a metathesis polymerized olefin polymer, especially a ROMP reaction polymerized cycloolefin polymer, incorporating a flame retarding agent.

SUMMARY OF THE INVENTION

The present invention addresses these needs by using a ruthenium or osmium carbene metathesis catalyst to mediate the metathesis polymerization reaction, and a flame-retarding agent which does not adversely poison or otherwise adversely affect the metathesis catalyst or the polymerization reaction.

More particularly, a ruthenium or osmium carbene metathesis catalyst is used as the catalyst for the metathesis polymerization of olefin monomers, and the polymerization reaction takes place with the catalyst/monomer mixture in direct contact with a suitable flame-retarding agent. Generally, the flame-retarding agent is incorporated into the catalyst/monomer mixture prior to the polymerization reaction.

Other features and advantages of the invention will become apparent to those skilled in the art upon review of the following detailed description and claims.

Before embodiments of the invention are explained in detail, it is to be understood that the invention is not limited in its application to the details of the composition and concentration of components set forth in the following description. The invention is capable of other embodiments and of being practiced or being carried out in various ways. Also, it is understood that the phraseology and terminology used herein is for the purpose of description and should not be regarded as limiting.

DETAILED DESCRIPTION OF AN EMBODIMENT OF THE INVENTION

The invention involves polymerization of olefins through olefin metathesis reactions, especially Ring Opening Metathesis Polymerization (ROMP) reactions, with a ruthenium or osmium carbene metathesis catalyst in the presence of a flame-retarding agent. The flame-retarding agent provides for better flame resistance of the polyolefin.

Suitable ruthenium and osmium carbene catalysts, the methods of synthesizing such catalysts, and suitable olefin monomers as well as the methods for performing and controlling the polymerization reaction, are disclosed in the following patents and patent application, all of which are incorporated herein by reference: U.S. Pat. Nos. 5,312,940 and 5,342,909 and WO 97/20865.

Catalysts

Generally suitable catalysts are ruthenium and osmium carbene complex catalysts disclosed in the above cited references.

The preferred ruthenium and osmium carbene complex catalysts include those which are stable in the presence of a variety of functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen. When the catalysts are stable in the presence of these groups, the starting monomers, impurities in the monomer, the coupling agents, any substituent groups on the catalyst, and other additives may include one or more of the above listed groups without deactivating the catalysts.

The catalyst preferably includes a ruthenium or osmium met al center that is in a +2 oxidation state, has an electron count of 16, and is pentacoordinated. These ruthenium or osmium carbene complex catalysts may be represented by the formula:

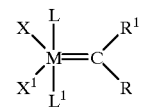

where:

M is Os or Ru;

R and $R^1$ may be the same or different and may be hydrogen or a substituent group which may be $C_2$–$C_{20}$ alkenyl, $C_2$–$C_2$, alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl. Optionally, the substituent group may be substituted with one or more groups selected from $C_1$–$C_5$ alkyl, halide, $C_1$–$C_5$ alkoxy, and phenyl. The phenyl group may optionally be substituted with one or more groups selected from halide, $C_1$–$C_5$ alkyl, and $C_1$–$C_5$ alkoxy. Optionally, the substituent group may be substitutes with one or more functional groups selected from hydroxyl, thiol, thioether, ketone, aldehyde, estear, ether, amine, imine, amide, nitro, carboxylic acid, disulfide, carbonate, isocyanate, carbodiimide, carboalkoxy, peroxo, anhydride, carbamayte, and halogen. In a preferred embodiment, R and $R^1$ are the same or different and may be hydrogen, substituted aryl, unsubstituted aryl, substituted vinyl, and unsubstituted vinyl; where the substituted aryl and substituted vinyl are each substituted with one or more groups selected from hydroxyl, thiol, thioether, ketone, alclehyde, ester, ether, amine, imine, amide, nitro, carboxylic acid, disulfide, carbonate, isocyanate, carbodiimide, carboalkoxy, peroxo, anhydride, carbamate, and halogen, $C_1$–$C_5$ alkyl, $C_1$–C5 alkoxy, unsubstituted phenyl, and phenyl substituted with halide, $C_1$–$C_5$ alkyl or $C_1$–$C_5$ alkoxy;

X and $X^1$ may be the same or different and may generally be hydrogen or any anionic ligand. Generally, an anionic ligand is any ligand which when removed from a metal center in its closed shell electron configuration has a negative charge. In a preferred embodiment, X and $X^1$ are the same or different and may be halogen, hydrogen or a substituent group selected from $C_1$–$C_{20}$ alkyl, aryl, $C_1$–$C_{20}$ alkoxide, aryloxide, $C_3$–$C_{20}$ alkyldiketonate, aryldiketonate, $C_1$–$C_{20}$ carboxylate, aryl or $C_1$–$C_{20}$ alkylsulfonate, $C_1$–$C_{20}$ alkylthio, $C_1$–$C_{20}$ alkylsulfonyl, and $C_1$–$C_{20}$ alkylsulfinyl. The substituent groups may optionally be substituted with $C_1$–$C_5$ alkyl, halogen, $C_1$–$C_5$ akloxy or phenyl. The phenyl may be optionally substituted with halogen, $C_1$–$C_5$ alkyl, or $C_1$–$C_5$ alkoxy. In a more preferred embodiment, X and $X^1$ are the same or different and may be Cl, Br, I, H or a substituent group selected from benzoate, $C_1$–$C_5$ carboxylate, $C_1$–$C_5$ alkyl, phenoxy, $C_1$–$C_5$ alkoxy, $C_1$–$C_5$ alkylthio, aryl, and $C_1$–$C_5$ alkyl sulfonate. The substituent groups may be optionally substituted with $C_1$–$C_5$ alkyl or a phenyl group. The phenyl group may optionally be substituted with halogen, $C_1$–$C_5$ alkyl or $C_1$–$C_5$ alkoxy. In an even more preferred embodiment, X and $X^1$ are the same or different and are selected from Cl, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, and trifluoromethanesulfonate. In the most preferred embodiment, X and $X^1$ are both Cl; and L and $L^1$ may be the same or different and may be generally be any neutral electron donor. A neutral electron donor is any ligand which, when removed from a metal center in its closed shell electron configuration, has a neutral charge. In a preferred embodiment, L and $L^1$ may be the same or different and may be phosphines, sulfonated phosphines, phosphites, phosphinites, phosphonites, arsines, stibines, ethers, amines, amides, sulfoxides, carboxyls, nitrosyls, pyridines, and thioethers. In a more preferred embodiment, L and $L^1$ are the same or different and are phosphines of the formula $PR^3R^4R^5$ where $R^3$ is a secondary alkyl or cycloaklyl and $R^4$ and $R^1$ are the same or different and are aryl, $C_1$–$C_{10}$ primary alkyl, secondary alkyl, or cycloaklyl. In the most preferred embodiment, L and $L^1$ are the same or different and are —P(cyclohexyl)$_3$, —P(cyclopentyl)$_3$, or —P(isopropyl)$_3$. L and $L^1$ may also be —P(phenyl)$_3$.

A preferred group of catalysts are those where M is Ru; $R^1$ and R are hydrogen or substituted or unsubstituted aryl or substituted or unsubstituted vinyl; X and $X^1$ are Cl; and L and $L^1$ are triphenylphosphines or trialkylphosphines such as tricyclopentylphosphine, tricyclohexylphosphine, and triisopropylphosphine. The substituted aryl and substituted vinyl may each be substituted with one or more groups including $C_1$–$C_5$ alkyl, halide, $C_1$–$C_5$ alkoxy, and a phenyl group which may be optionally substituted with one or more halide, $C_1$–$C_5$ alkyl, or $C_1$–$C_5$ alkoxy groups. The substituted aryl and substituted vinyl may also be substituted with one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen.

Particularly preferred catalysts can be represented by the formulas:

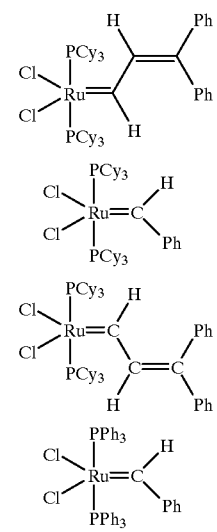

where Cy is cyclopentyl or cyclohexyl, and Ph is phenyl.

The most preferred catalysts can be represented by the formula:

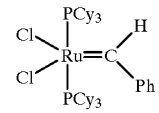

where Cy is cyclopentyl or cyclohexyl, and Ph is phenyl.

The catalysts described above are useful in polymerization of a wide variety of olefin monomers through metathesis polymerization, particularly ROMP of cycloolefins.

Monomers

Suitable monomers include olefins that can be polymerized by any of the ruthenium or osmium metathesis polymerization catalysts that were discussed above.

The olefin monomers may be unfunctionalized or functionalized to contain one or more functional groups selected from the group consisting of hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen. The olefin may be a strained cyclic olefin, or unstrained cyclic olefin each of which may be functionalized or unfunctionalized.

Preferred monomers include functionalized or unfunctionalized cyclic olefins that are polymerized through ROMP reactions. This polymerization process includes contacting a functionalized or unfunctionalized cyclic olefin with a ruthenium or osmium metathesis catalysts discussed above. The cyclic olefins may be strained or unstrained and may be monocyclic, bicyclic, or multicyclic olefins. If the cyclic olefin is functionalized, it may contain one or more functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen.

Suitable cyclic olefin monomers include monomers disclosed in U.S. Pat. No. 4,943,621 to Janda, et al., U.S. Pat. No. 4,324,717 to Layer, and U.S. Pat. No. 4,301,306 to Layer, all of which are herein incorporated by reference.

Suitable cyclic olefin monomers include norbornene-type monomers which are characterized by the presence of at least one norbornene group which can be substituted or unsubstituted. Suitable norbornene type monomers include substituted norbornenes and unsubstituted norbornene, dicyclopentadiene, dimethyldicyclopentadiene, dihydrodicyclopentadiene, cyclopentadiene trimers, tetramers of cyclopentadiene, tetracyclododecene, and substituted tetracyclododecenes. Common norbornene-type monomers can be represented by the following formulas:

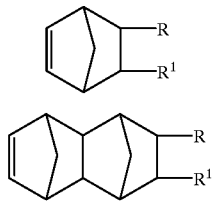

wherein R and R$^1$ may be the same or different and may be hydrogen or a substitute group which may be a halogen, $C_1$–$C_{12}$ alkyl groups, $C_2$–$C_{12}$ alkylene groups, $C_6$–$C_{12}$ cycloalkyl groups, $C_6$–$C_{12}$ cycloalkylene groups, and $C_6$–$C_{12}$ aryl groups or R and R$^1$ together form saturated or unsaturated cyclic groups of from 4 to 12 carbon atoms with the two ring carbon atoms connected thereto, said ring carbon atoms forming part of and contributing to the 4 to 12 carbon atoms in the cyclic group.

Less common norbornene type monomers of the following formulas are also suitable:

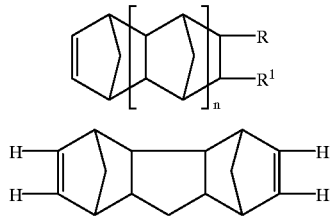

wherein R and R$^1$ have the same meaning as indicated above and n is greater than 1. For example, cyclopentadiene tetramers (n=2), cyclopentadiene pentamers (n=3) and hexacyclopentadecene (n=2) are suitable monomers for use in this invention.

Other specific examples of monomers suitable for use in this invention include:
ethylidenenorbornene,
methyltetracyclododecene,
methylnorbornene,
ethylnorbornene,
dimethylnorbornene and similar derivatives,
norbornadiene,
cyclopentene,
cycloheptene,
cyclooctene,
7-oxanorbornene,
7-oxanorbornene derivatives,
7-oxabicyclo[2.2.1]hept-5ene derivatives,
7-oxanorbornadiene,
cyclododecene,
2-norbornene, also named bicyclo[2.2.1]-2-heptene and substituted bicyclic norbornenes,
5-methyl-2-norbornene,
5,6-dimethyl-2-norbornene,
5-ethyl-2-norbornene,
5-butyl-2-norbornene,
5-hexyl-2-norbornene,
5-octyl-2-norbornene,
5-dodecyl-2-norbornene,
5-isobutyl-2-norbornene,
5-octadecyl-2-norbornene,
5-isopropyl-2-norbornene,
5-phenyl-2-norbornene,
5-p-toluyl-2-norbornene,
5-a-naphthyl-2-norbornene,
5-cyclohexyl-2-norbornene,
5,5-dimethyl-2-norbornene,
dicyclopentadiene (or cyclopentadiene dimer),
dihydrodicyclopentadiene (or cyclopentene cyclopentadiene codimer),
methyl-cyclopentadiene dimer,
ethyl-cyclopentadiene dimer,
tetracyclododecene, also named 1,2,3,4,4a,5,8,8a-octahydro-1,4:5,8-dimethyanonaphthalene
9-methyl-tetracyclo[6.2.1.1$^{3,6}$.0$^{2,7}$]-4-dodecene, also named 1,2,3,4,4a,5,8,8a-octahydro-2-methyl-4,4:5,8-dimethanonaphthalene
9-ethyl-tetracyclo[6.2.1.1$^{3,6}$.0$^{2,7}$]-4-dodecene,
9-propyl-tetracyclo[6.2.1.1$^{3,6}$.0$^{2,7}$]-4-dodecene,
9-hexyl-tetracyclo[6.2.1.1$^{3,6}$.0$^{2,7}$]-4-dodecene,
9-decyl-tetracyclo[6.2.1.1$^{3,6}$.0$^{2,7}$]-4-dodecene,
9,10-dimethyl-tetracyclo[6.2.1.1$^{3,6}$.0$^{2,7}$]-4-dodecene,
9-ethyl, 10-methyl-tetracyclo[6.2.1.1$^{3,6}$.0$^{2,7}$]-4-dodecene,
9-cyclohexyl-tetracyclo[6.2.1.1$^{3,6}$.0$^{2,7}$]-4-dodecene,
9-chloro-tetracyclo[6.2.1.1$^{3,6}$.0$^{2,7}$]-4-dodecene,
9-bromo-tetracyclo[6.2.1.1$^{3,6}$.0$^{2,7}$]-4-dodecene,
cyclopentadiene-trimer,
methyl-cyclopentadiene-trimer, and the like.

In a preferred embodiment, the cyclic olefin is cyclobutene, dimethyl dicyclopentadiene, cyclopentene, cycloheptene, cyclooctene, cyclononene, cyclodecene, cyclooctadiene, cyclononadiene, cyclododecene, norbornene, norbornadiene, 7-oxanorbornene, 7-oxanorbornadiene, and dicyclopentadiene; each of which may be functionalized or unfunctionalized. In a more preferred embodiment, the cyclic olefin is dicyclopentadiene. Suitable dicyclopentadiene is commercially available, for example, from Lyondell under the trademarks Lyondell 108 and Lyondell 103. The monomer purity is preferably less than about 95 weight percent.

This invention contemplates preparation of homopolymers, as well as random and block copolymers and terpolymers of the suitable monomers discussed above.

Flame-Retarding Agents

As used herein, "flame-retarding agent" means any material applied to or incorporated in or or the polyolefin material that reduces the flammability, reduces the flame spreading ability, reduces the smoke density, or increases the autoextinguishability of the polyolefin material when the material is exposed to heat or flame.

As used herein, a "compatible flame-retarding agent" is a flame-retarding agent that is capable of being used in the presence of the metathesis polymerization reactions, preferably Ring Opening Metathesis Polymerization (ROMP) reactions, catalyzed by a ruthenium or osmium catalyst, without adversely affecting the catalyst or the polymerization reaction. Compatible flame-retarding agents include conventional flame-retarding agents which do not include functional groups that will poison or adversely effect the metathesis polymerization reaction or catalyst.

Preferably, the flame-retarding agent is added to the monomer prior to polymerization, and preferably before the addition of the catalyst; although, this is not critical. The flame-retarding agent may comprise up to about 50 weight percent of the total composition. Preferably, the flame-retarding agent comprises from about 1 to about 40 weight percent of the total composition, and more preferably from about 5 to about 30 weight percent of the total composition.

The flame-retarding agent can be either soluble (homogeneous) or insoluble (heterogeneous) within the monomer/ catalyst reaction mixture. The soluble or insoluble flame-retarding agents can be used independently, or together.

The flame-retarding agent may be substantially homogeneously disbursed throughout the polyolefin material, or may be concentrated in specific areas. In some embodiments of the invention, the flame-retarding agent may be concentrated near the surfaces of the polyolefin article. This can be accomplished by different polymer processing techniques which enhance movement of the flame-retarding agent to a desired location within the article being formed. For example, using centrifugal casting techniques, the flame-retarding agent can be moved by centrifugal force to an outer or inner surface of the material, depending upon the densities of the flame-retarding agent and the monomer/catalyst mixture.

Suitable flame-retarding agents include a variety of conventional intumescent, zinc borate, brominated organic, chlorinated organic, aluminum hydroxide hydrate, magnesium hydroxide, chlorinated paraffin, phosphate esters, antimony oxide, brominated aryl phosphate, silicone or siloxirane reagents. Preferably, those which do not contain the following functionalities: vinyl ethers; active oxygen functionalities such as hydroperoxides or activated epoxides; acetylenes; and other Lewis bases that may poison or adversely affect the ruthenium or osmium catalyst.

In a more preferable embodiment, the flame-retarding agents also do not include thiols, primary amines, terminal epoxides, and certain conjugated diene functionalities.

Intumescent flame-retarding agents are preferred. Preferable intumescent flame-retarding agents include those comprising: polyammoniumphosphate, a substituted polyol, and a substituted melamine. Such preferable intumescent flame-retarding agents are commercially available from Clariant under the trademarks Exolit IFR-11 and Exolit IFR-10.

Other preferred flame-retarding agents are listed in the following chart which includes the category, formula, suppliers and brand names of the flame-retarding agents:

| Category | Formula | Supplier | Brand name |
| --- | --- | --- | --- |
| Intumescent | ammonium polyphosphate | Monsanto | Phoscheck P30 |
| | dipentaerythritol | Hercules | PE-200 |
| | melamine | Aldrich | |
| Intumescent | ammonium polyphosphate + | Clariant | Exolit 1FR-11, 1FR-10 |
| Zinc Borate | zinc borate | US Borax | Firebrake ZB-fine |
| Brominated organics | tribromophenol | Great Lakes | PH-73, FF-680 |
| | 1,2-bis(tribromophenoxy)-ethane | Great Lakes | FF-680 |
| Chlorinated organic | tris(betachloroethyl)phosphate | Akzo Nobel | Fyrol CEF |
| ATH | alumina trihydrate | Franklin | ATH H-series |
| MgOH | magnesium hydroxide | Aldrich | |
| Chlorinated paraffin | chlorinated paraffin | Dover | Chlorez 700, Paril 140 |
| | sodium tetraborate decahydrate | Aldrich | |
| | magnesium carbonate hydroxide pentahydrate | Aldrich | |
| Phosphate esters | phosphate esters | Monsanto | Santicizer 148 |
| Antimony Oxide | antimony oxide | Elf Atochem | Thermoguard |
| | bromonated arly phosphate | PMC | Reoflam PB460 |

Reaction and Processing Conditions

The parameters for the metathesis polymerization reactions used in the current invention, such as the atmosphere, the ratio of catalyst to monomer, the reaction temperatures, the solvents that may be used, the additives and other agents that may be present during the polymerization reaction, and the methods for carrying out the metathesis polymerization are disclosed in the incorporated references identified above.

Generally, the polymerization of the olefin is carried out by adding the desired ruthenium or osmium carbene metathesis catalyst to the monomer starting material which has been heated to a starting resin temperature. Alternatively, the catalyst may be first added to the monomer starting material and the mixture then heated to the required temperature. The starting resin temperature is not critical; but, as is known, this temperature does affect the rate of the polymerization reaction. Generally the reaction temperature will be in the range of about 0° C. to about 100° C., and preferably about 25° C. to about 45° C.

The ratio of catalyst to starting material is not critical and can within the range from about 1:5 to about 1:200,000 by mole. Ratios of catalyst. to starting material of between about 1:2,000 and 1:15,000 by mole are preferred. The invention may be practiced using catalyst/starting material ratios outside of the above ranges.

The monomer starting material may optionally be refluxed, run through absorption purification, and degassed before the catalyst is added; although, none of these procedures are necessary to practice the invention.

The flame-retarding material is preferably added before the catalyst; although, this is not critical. Additionally, if a gel modification additive, cross-linking agent, or other additive is used it is preferred that the additives be added before the catalyst; although, this is not critical.

Although it is preferred that the reaction be conducted in the absence of a solvent this is not critical. Possible solvents that may be used include organic, protic, or aqueous solvents which are inert under the reaction conditions. Examples of suitable solvents may include aromatic hydrocarbons, chlorinated hydrocarbons, ethers, aliphatic hydrocarbons, alcohols, water, or mixtures thereof.

The monomer starting material may optionally include one or more gel modification additives which are added to control the pot life of the reaction mixture.

The monomer starting material may also optionally include one or more cross-linking agents for initiating additional post cure cross-linking of the polyolefin.

The monomer starting material may optionally include additives such as fillers, binders, plasticizers, pigments, dyes, etc., as is known in the art. However, because of the functional group tolerance of the catalysts, the range of available additives may be much greater than has been possible using the conventional catalyst systems.

After polymerization is complete (i.e., after the article has "cured") the polyolefin article may be post cured to initiate increased cross-linking. As is known, additional cross-linking may be accomplished by post-curing at an elevated temperature. As is well known in the art, other methods may be used to post-cure the polyolefin material.

Unlike previous catalyst systems, the catalyst/monomer starting material mixture employed by this invention may remain liquid for a considerable period of time depending on the temperature and the amount of gel modification additive present. This characteristic allows polyolefin articles to be made using a variety of polymer processing techniques.

Methods for Making Articles

Polyolefin articles having the flame-retarding agent may be made using various methods known to be useful for producing polymer articles. Suitable methods include a variety of polymer processing techniques, such as: casting, centrifugal casting, pultrusion, molding, rotational molding, open molding, reaction injection molding (RIM), resin transfer molding (RTM), pouring, vacuum impregnation, surface coating, filament winding and other methods known to be useful for producing reinforced polymer articles. Preferably, the polymer structures are manufactured through centrifugal casting or filament winding.

As discussed above, in some embodiments of the invention, the flame-retarding agent may be concentrated in specific areas of the polymer article produced by the use of various polymer processing techniques. For example, using centrifugal casting techniques, the flame-retarding agent can be moved by centrifugal force to an outer or inner surface of the material, depending upon the densities of the flame-retarding agent and the monomer/catalyst mixture. In one embodiment, it is preferable that the polymer article be pipe made through a centrifugal casting method, and that the flame-retarding agent be insoluble in, and has a greater density than the monomer/catalyst reaction mixture so that the flame-retarding agent is concentrated on the outer surface of the pipe. In another embodiment, it is preferable that the polymer article be pipe made through a centrifugal casting method, and that the flame-retarding agent be insoluble in, and has a smaller density than the monomer/catalyst reaction mixture so that the flame-retarding agent is concentrated on the inner surface of the pipe.

The polyolefin articles may be reinforced with appropriate reinforcing material incorporated into the structure. Suitable reinforcing materials include those that add to the strength or stiffness of the polymer composite when incorporated with the polymer. Reinforcing material can be in the form of filaments, fibers, rovings, mats, weaves, fabrics, or other known structures. Preferably, the reinforcing material is in filament or fiber form or fibers that are woven into a woven roving form.

Representative suitable reinforcement Materials include barium sulfate; minerals, such as glass, carbon, graphite, ceramic, boron, and the like; metallic materials; organic polymers, such as aromatic polyamides including the aramid fibers, such as Kevlar®, and polybenzimide, polybenzoxazol, polybenzothiazol, polyesters, and the like; polyolefins; fluoropolymer, such as Halar®; cellulosic materials; hybrids and mixtures of the above, and other material known to be useful as reinforcing material for polymer systems.

The reinforcing materials may be "sized", i.e., treated or coated with a coupling agent, often also referred to as a sizing or bonding agent, to render them more compatible for adhering with the olefin polymer matrix. As used herein, "coupling agent" means any material that can be applied to a reinforcing material that improves adhesion/wetout between the reinforcement materials and the polyolefin.

The coupling agents must be capable of being used in the presence of the metathesis polymerization reactions, preferably Ring Opening Metathesis Polymerization (ROMP) reactions, catalyzed with a ruthenium or osmium catalyst, without adversely affecting the catalyst or the polymerization reaction. Suitable sizing agents include conventional sizing agents which do not include functional groups that will poison or adversely effect the metathesis polymerization reaction or catalyst.

Suitable coupling agents include a variety of conventional chromium; silane; titanate; zirconate, zirco-aluminate, and hydroxyl terminated amphaphilic coupling agents. Preferably, those which do not contain the following functionalities: vinyl ethers; active oxygen functionalities such as hydroperoxides or activated epoxides; acetylenes; and other Lewis bases that may poison or adversely affect the ruthenium or osmium catalyst.

The following examples are intended to exemplify embodiments of the invention and are not to be construed as limitations thereof.

EXAMPLE 1

A two inch diameter reinforced polydicyclopentadiene (PolyDCPD) pipe including a flame-retarding agent exemplifying the invention was produced using a centrifugal casting method. A standard fiberglass fabric was used as the reinforcing material. The fiberglass was sized with a methacrylatochromic chloride complex sizing agent purchased from Du Pont under the trademark "Volan". The following components, including an intumescent flame-retarding agent purchased from Clariant under the trademark Exolit IFR-11, were mixed to make the DCPD resin/catalyst mixture:

| Ingredient | Partr Per Hundred Resin |
| --- | --- |
| DCPD Monomer | 100 |
| Catalyst* | 0.083 |
| Triphenyl phosphine | 0.0938 |
| Exolit IFR-11 or 10 | 11.11 |
| Ciba-Geigy Tinuvin 123 | 0.10 |
| Albermarle Ethanox 702 | 4.0 |
| TOTAL | 115.387 |

*bis-(tricyclohexylphosphine)-benzylidine ruthenium dichloride

The following process steps were then used to produce the pipe:

1. The Volan sized fiberglass fabric was rolled around a tube (mandrel) smaller than the in side diameter of the desired finished pipe. The number of layers and weight of the fabric may vary with the diameter and pressure rating of the finished pipe.
2. The fabric and tube were inserted into the mold tube, and the tube was spun at a high enough revolutions per minute (RPM) to "unwind" the fabric from the mandrel.
3. After the mandrel was withdrawn, plugs were inserted into each end of the mold tube. One of the plugs included a port which could be sealed after injecting the resin/catalyst mixture into the tube through the port.
4. A premeasured amount of the above resin/catalyst mixture formulation was injected into the tube through the port in the end plug. The amount of resin depends upon the desired wall thickness and diameter of the finished pipe.
5. The tube was spun at a speed which will result in approximately 75 G's of force on the outside of the mold tube. A temperature of 85–90° F. was maintained by keeping the temperature of the room in which the pipe was produced at this temperature. This insured that the mold, glass and resin are all the same temperature.
6. The tube was allowed to spin for approximately 30 minutes (the resin exothermed and gelled during this time).
7. The mold tube and pipe were removed from the spinning machine and placed in a post cure oven for 30 minutes at 300° F.
8. The pipe was removed from the mold tube, the ends of the pipe were trimmed, and the mold tube was recycled.

After curing, the pipe was subjected to a flame by holding the pipe about one inch above the flame of a Fisher brand laboratory gas burner. Initially, there was some charring of the outer layer. After five minutes of test time, there was some burning of the outside layer, but the flame extinguished itself within 15 seconds after being removed from the flame of the gas burner. The pipe remained structurally sound, showing charring on the outside and some blistering on the inside.

EXAMPLE 2

In a comparative example, a control sample of two inch diameter reinforced polyDCPD pipe was produced in the manner described in Example 1, except that a flame-retarding agent was not used.

After curing, the control sample, was subjected to flame by holding the pipe about one inch above the flame of a Fisher brand laboratory gas burner. The pipe almost immediately began to burn vigorously. When the pipe was removed from the flame of the burner after being exposed for about 15 seconds, it continued to burn vigorously. The pipe did not extinguish itself, and had to be immersed in water to extinguish the flame.

I claim:

1. A method of making a flame retardant polyolefin article comprising the steps of:
    a) admixing an olefin monomer, a one-part metathesis polymerization catalyst, and a compatible flame-retarding agent to form a mixture; and
    b) subjecting the mixture to polymerization conditions such that the olefin monomer polymerizes and the flame-retarding agent is incorporated in the polyolefin article.
2. The method of claim 1 wherein the olefin monomer comprises a cyclic olefin.
3. The method of claim 2 wherein the olefin monomer comprises a norbornene-type monomer.
4. The method of claim 3 wherein the olefin monomer comprises dicyclopentadiene.
5. The method of claim 2 further comprising the step of forming the mixture into a pipe or pipe fitting before the olefin monomer polymerizes.
6. The method of claim 5 wherein the pipe or pipe fitting is formed by centrifugal casting.
7. The method of claim 2 wherein the flame-retarding agent comprises an intumescent flame-retarding agent, zinc borate, a brominated organic, a chlorinated organic, aluminum hydroxide hydrate, magnesium hydroxide, a chlorinated paraffin, a phosphate ester, antimony oxide, a brominated aryl phosphate, silicone or siloxirane reagents, each optionally substituted.
8. The method of claim 1 wherein the flame-retarding agent comprises an intumescent flame-retarding agent selected from the group consisting of polyammoniumphosphate, a substituted polyol, and a substituted melamine.
9. The method of claim 6 wherein the flame-retarding agent is more dense than the olefin monomer so that the flame-retarding agent is concentrated in an exterior portion of the pipe or pipe fitting.
10. The method of claim 6 wherein the flame-retarding agent is less dense than the olefin monomer so that the flame-retarding agent is concentrated in an interior portion of the pipe or pipe fitting.
11. The method of claim 2 wherein the metathesis polymerization catalyst comprises a ruthenium carbene complex catalyst or an osmium carbene complex catalyst.
12. The method of claim 1 wherein the metathesis polymerization catalyst is of formula:

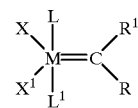

where:
    M is Os or Ru;
    R and $R^1$ are independently selected from hydrogen, or a substituent group selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, each substituent group optionally substituted with one or more groups selected from $C_1$–$C_5$ alkyl, halide, $C_1$–$C_5$ alkoxy, or a phenyl group optionally substituted with halide, $C_1$–$C_5$ alkyl, or $C_1$–$C_5$ alkoxy;

X and $X^1$ are independently selected from hydrogen or an anionic ligand; and

L and $L^1$ are any neutral electron donor.

13. A method of making a flame retardant polyolefin article, the method comprising admixing a cyclic olefin monomer with a flame-retarding agent prior to polymerization, the improvement comprising carrying out the polymerization reaction in the presence of a one-part metathesis polymerization catalyst which comprises Ru or Os.

* * * * *